United States Patent [19]

Bauerle et al.

[11] Patent Number: 4,472,364

[45] Date of Patent: Sep. 18, 1984

[54] PROCESS FOR REMOVAL OF SULFUR OXIDES FROM HOT GASES

[75] Inventors: George L. Bauerle, Simi Valley; Arthur L. Kohl, Woodland Hills, both of Calif.

[73] Assignee: Rockwell Internaltional Corporation, El Segundo, Calif.

[21] Appl. No.: 391,196

[22] Filed: Jun. 23, 1982

[51] Int. Cl.$^3$ ............................................. C01B 17/00
[52] U.S. Cl. ................................. 423/242; 423/166; 423/244
[58] Field of Search .......... 423/242 A, 242 R, 244 A, 423/244 R, 166

[56] References Cited

U.S. PATENT DOCUMENTS

| | | | |
|---|---|---|---|
| 2,718,453 | 9/1955 | Beckman | 23/2 |
| 2,862,789 | 12/1958 | Burgess | 423/242 |
| 3,438,722 | 4/1969 | Heredy et al. | 23/2 |
| 3,438,727 | 4/1969 | Heredy | 23/181 |
| 3,438,728 | 4/1969 | Grantham | 23/181 |
| 3,533,748 | 10/1970 | Finfer et al. | 23/226 |
| 3,932,587 | 1/1976 | Grantham et al. | 423/242 |
| 4,197,278 | 4/1980 | Gehri et al. | 423/242 |
| 4,198,380 | 4/1980 | Kohl | 423/242 |
| 4,355,013 | 10/1982 | Bechthold et al. | 423/242 |
| 4,388,281 | 6/1983 | Holter et al. | 423/242 X |

*Primary Examiner*—Gregory A. Heller
*Attorney, Agent, or Firm*—Henry Kolin; Clark E. DeLarvin; H. Fredrick Hamann

[57] ABSTRACT

A process for the removal of sulfur oxides from two gas streams containing the same. One gas stream is introduced into a spray dryer zone and contacted with a finely dispersed spray of an aqueous medium containing an absorbent for sulfur oxides. The aqueous medium is introduced at a controlled rate so as to provide water to the gas in an amount to produce a cooled product gas having a temperature at least 7° C. above its adiabatic saturation temperature and from about 125-300% of the stoichiometric amount of absorbent required to react with the sulfur oxides to be removed from the gas stream. The effluent from the spray dryer zone comprises a gas stream of reduced sulfur oxide content and contains entrained dry particulate reaction products including unreacted absorbent. This gas stream is then introduced into a particulate removal zone from which is withdrawn a gas stream substantially free of particles and having a reduced sulfur oxide content. The dry particulate reaction products are collected and utilized as a source of absorbent for a second aqueous scrubbing medium. Concurrently, the other gas stream is introduced into an aqueous scrubbing zone and contacted with the second aqueous scrubbing medium containing unreacted absorbent for the sulfur oxides. An effluent gas stream is withdrawn from the aqueous scrubbing zone and comprises a water-saturated gas stream of reduced sulfur oxide content and substantially free of particles. The effluent gas streams from the particulate removal zone and the aqueous scrubbing zone are combined in such proportions that the combined gas stream has a temperature above its adiabatic saturation temperature.

4 Claims, 1 Drawing Figure

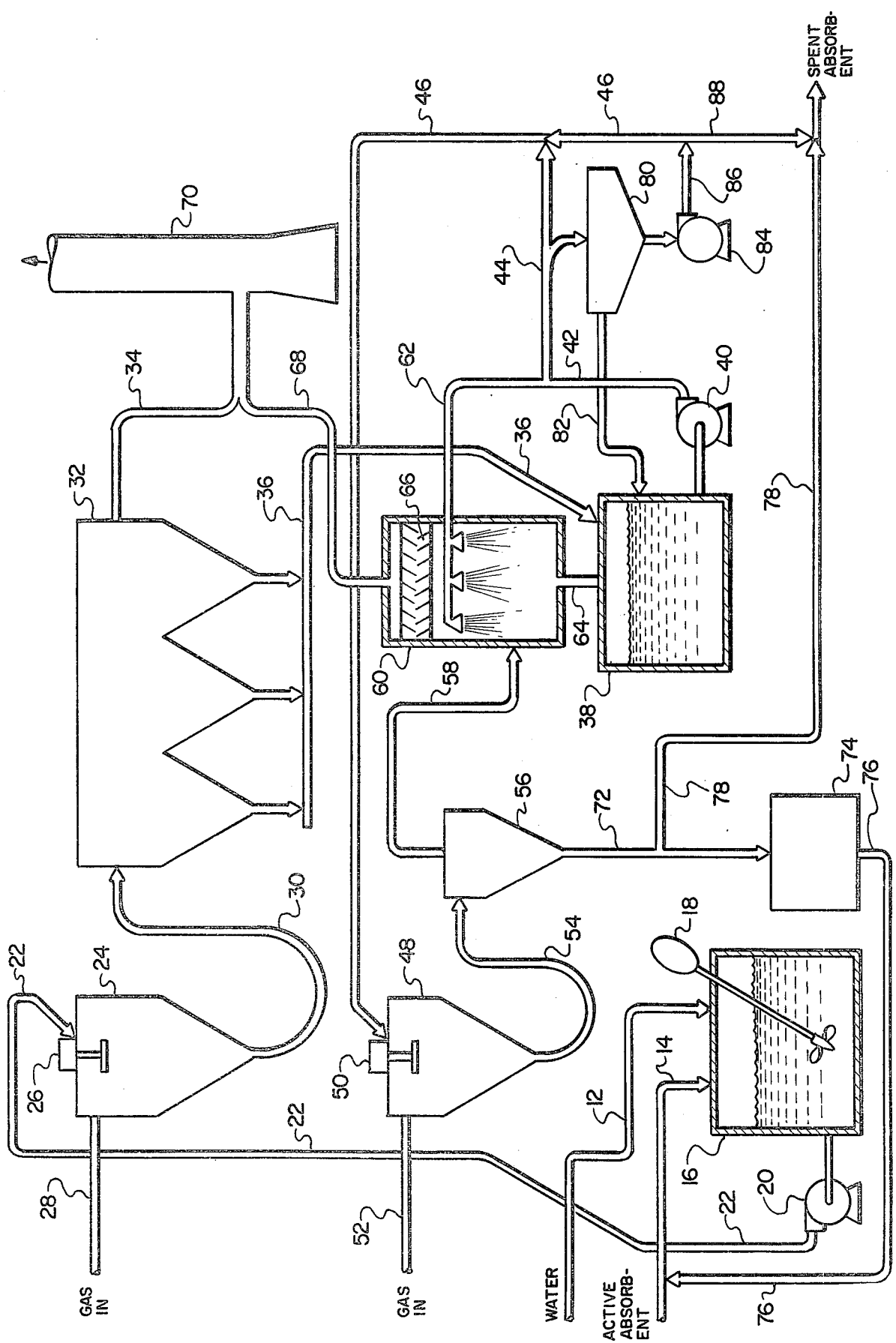

PROCESS FOR REMOVAL OF SULFUR OXIDES FROM HOT GASES

BACKGROUND OF THE INVENTION

The present invention relates to a process for the removal of sulfur oxides from hot gases containing the same. It particularly relates to a process wherein two gas streams containing sulfur oxides are concurrently contacted with an aqueous sulfur oxide absorbent in a manner such that when they are combined the effluent gas stream is water unsaturated, has a substantially reduced sulfur oxide content and substantially complete utilization of the absorbent is obtained.

Sulfur oxides, principally present as sulfur dioxide, are found in the waste gases discharged from many metal refining and chemical plants, and in the flue gases from power plants generating electricity by the combustion of fossil fuels. In addition, sulfur-containing gases may be formed in the partial combustion or gasification of sulfurcontaining fuels, such as coal or petroleum residua. The control of air pollution resulting from the discharge of sulfur oxides into the atmosphere has become increasingly urgent. An additional incentive for the removal of sulfur oxides from waste gases is the recovery of the sulfur values otherwise lost by discharge to the atmosphere. However, in some instances, such as when the flue gases are from power plants, which based on the combustion of an average coal may contain as much as 3000 ppm sulfur dioxide and 30 ppm sulfur trioxide by volume, the large volumes of these gases relative to the quantity of sulfur which they contain make recovery or removal of the sulfur compounds expensive. Thus, while the possible by-products, such as elemental sulfur and sulfuric acid, that ultimately may be obtained from the recoverable sulfur values have virtually unlimited markets as basic raw materials, they sell for relatively low prices. Consequently, an inexpensive sulfur recovery process is required.

Many processes have been proposed and investigated for the desulfurization of flue gases. For example, dry processes have been proposed in which the sulfur dioxide is removed either by chemical reaction with a solid absorbent or by absorption on its surface followed by oxidation of the adsorbed sulfur dioxide. In U.S. Pat. No. 2,718,453 there is shown a process wherein finely powdered calcium carbonate is blown into a combustion gas to form calcium sulfate or calcium sulfite. In general, a reaction between a solid and a gas is relatively slow and inefficient, being limited by the available surface area of the solid. Also certain of the resultant products do not readily lend themselves to regeneration of the starting material or recovery of the removed sulfur values.

In U.S. Pat. Nos. 3,438,722; 3,438,727; and 3,438,728 sulfur oxide impurities are removed from a hot combustion gas by contacting it at an elevated temperature with a molten salt mixture as the active absorbent. The spent absorbent is then regenerated chemically and recirculated. A disadvantage of this process is that a retrofit to many older existing power plant utility installations presents certain economic disadvantages because of the requirements for modifying the boiler systems of these plants to obtain a flue gas having the required elevated temperature for treatment with a molten salt.

Wet absorption processes are suitable for treating low temperature flue gases or hot gases if a precooling step is included. In a typical wet absorption process, the flue gas is washed with an aqueous slurry of calcium hydroxide or calcium carbonate. This type of process has been utilized in many power plants. In addition, aqueous sodium sulfite or ammonia solutions also have been utilized in wet processes.

A typical wet absorption process is described in U.S. Pat. No. 3,533,748 wherein a waste gas stream containing sulfur oxides is scrubbed with an aqueous solution of a soluble alkali such as sodium carbonate or sodium hydroxide to form sulfite and sulfate in solution. The resulting solution is then evaporated to precipitate solid alkali metal sulfite and sulfate salts, which can be separated from the solution and further processed.

While these wet absorption processes have some advantages, they suffer from a common drawback of producing a liquid effluent containing a large amount of water relative to the sulfur oxide absorbed, which effluent is not amenable to simple high temperature reduction and regeneration. Thus, difficulties arise where economic and efficient recovery of the absorbent and sulfur values is desired. In many instances, the recovery of elemental sulfur, a preferred product, is not economical. Still further, the treated gas stream is saturated with water and if discharged to the atmosphere without reheating will form an objectionable plume. An additional drawback of the wet absorption processes is their requirement of a low temperature, water-saturated feed gas to avoid evaporation of the absorbent. Since most flue gases are available at a temperature of 100°–300° C. it is common practice to install a water quench gas cooler unit ahead of the wet scrubber to precondition the feed gas.

A more recent approach to the removal of sulfur oxides from hot gas streams is shown in U.S. Pat. No. 3,932,587. A hot sulfur oxide containing waste gas is contacted in a spray dryer with an aqueous scrubbing medium containing an absorbent selected from the group consisting of alkali metal carbonates, bicarbonates and mixtures thereof. The scrubbing medium is introduced in a sufficient quantity to provide a resultant reaction product comprising a flowable, dry powder mixture containing from 20–85 wt. % alkali metal sulfite and sulfate; the balance comprising unreacted absorbent. Thereafter, the dry powder product is treated to recover hydrogen sulfide gas as a product and regenerate the alkali metal absorbent for recirculation in the process. A disadvantage of this process is that it requires an active alkali metal absorbent to get high sulfur oxide removal in a single spray drying zone. In addition, it does not provide for the substantially complete utilization of the absorbent concurrently with high sulfur oxide removal.

U.S. Pat. No. 4,197,278 discloses a two-zone method of removing particulates sulfur oxides from a hot gas. The hot gas is contacted in a first spray dryer zone with a selected chemically reactive absorbent for the sulfur oxides and then sequentially contacted with the absorbent in a second fabric filter zone. The conditions of contact in the first spray dryer zone are controlled such that a substantial portion of the sulfur oxide and unreacted absorbent are carried over into a fabric filter zone; it being reported that the unreacted absorbent under such conditions will have an enhanced reactivity. Thus, the unreacted absorbent of enhanced reactivity coats the surface of the fabric filter and reacts with the sulfur oxide contained in the gas passing therethrough. This process provides a dry effluent gas and relatively high sulfur oxide removal. However, it is noted in the examples that high absorbent utilization is not obtained with the less reactive absorbents such as calcium hydroxide.

U.S. Pat. No. 4,198,380 discloses another process for removing sulfer oxides by sequential absorbent of the sulfur oxides in two zones. In each zone the hot gas is contacted with an aqueous scrubbing medium containing an alkali metal absorbent for the sulfur oxides. The aqueous medium is introduced into a spray dryer zone in an amount to produce a dry powder reaction product substantially free of unreacted absorbent and a substantially water-unsaturated gaseous reaction product of reduced sulfur oxide content. The gaseous reaction product of reduced sulfur oxide content is transferred into a wet scrubber zone where it is contacted with a sufficient amount of an aqueous solution of absorbent to provide a gaseous reaction product substantially free of sulfur oxide and an aqueous solution containing alkali metal sulfites, sulfates and unreacted absorbent, which solution is used as at least a part of the aqueous solution fed into the first zone. A disadvantage of this process is that like the wet scrubbing processes, it produces an effluent gas which is water saturated and will produce an objectionable plume if discharged to the atmosphere without reheating. Further, the total quantity of gas to be processed must pass through both a spray dryer-type absorber and a wet scrubber in series which leads to high equipment costs.

SUMMARY OF THE INVENTION

The present invention provides a process for the efficient removal of sulfur oxides from a gas stream. The gas stream is divided into two parts, or gas streams from different sources are treated concurrently in such a manner that after treatment there is provided a gas stream which is water unsaturated, and substantially free of sulfur oxides and particulates. It is a particular advantage of the present invention that the foregoing results are obtained concurrently with high absorbent utilization. Further, it is possible to obtain all of the reacted absorbent substantially free of any unreacted absorbent and in a dry state. Finally, the foregoing results can be obtained using alkaline earth-based absorbents without the need to use the more active alkali metal compounds. The terms "reactive" or "unreacted" absorbent refer to any form of the original absorbent material which has the ability to react with sulfur dioxide, typically the oxide, hydroxide, carbonate, or bicarbonate of an alkali or alkaline earth metal. The terms "reacted" or "spent" absorbent refer to any form of the original absorbent which no longer has a significant capacity for reacting with sulfur dioxide under the conditions of the process, typically, the sulfite and sulfate.

The process comprises introducing an aqueous medium containing an absorbent for sulfur oxides into a spray dryer zone and contacting it with a first gas stream. The aqueous medium is introduced at a controlled rate to provide water in an amount such that there is produced a cooled product gas having a temperature at least 7° C. above its adiabatic saturation temperature and the aqueous medium contains from about 125% to 300% of the stoichiometric amount of absorbent required to react with the sulfur oxides to be removed from the first gas stream. Thus, there is produced a gas stream of reduced sulfur oxide content and dry particulate reaction products including unreacted absorbent entrained in the gas stream. The gas stream then passes through a particulate removal zone such as a gas filter such as, a fabric filter to remove particulates and produce a gas stream substantially free of particulates having a reduced sulfur oxide content. All or a portion of said particulate removal zone may be within the spray dryer apparatus.

The separated particulate reaction products containing unreacted absorbent are then utilized as a source of reactive absorbent for a second aqueous scrubbing medium which is used to treat a second gas stream in an aqueous scrubbing zone. The second aqueous scrubbing medium contains unreacted absorbent in an amount to provide from about 100% to 200% of the stoichiometric amount required to react with the sulfur oxides to be removed from the second gas stream which is introduced into the aqueous scrubbing zone. In this zone there is produced a water-saturated, substantially particulate free gas stream of reduced sulfur oxide content. This stream and the treated first gas stream may then be combined for discharge to the atmosphere. The proportions of the two streams are controlled such that the combined gas stream has a temperature at least 50° C. and preferably at least 10° C. above its adiabatic saturation temperature, whereby it may be discharged to the atmosphere with little or no reheat required to prevent the formation of an objectionable plume. In accordance with a particularly preferred embodiment, the second gas stream is introduced into a spray dryer zone prior to its introduction into the aqueous scrubbing zone. In the spray dryer zone it is contacted with a portion of the aqueous scrubbing medium from the aqueous scrubbing zone to produce a dry powder product principally comprising reacted absorbent.

The selection of the particular absorbent to be utilized is not critical. Thus, the process of the present invention may be practiced with any absorbent which will react with the sulfur oxides to form a solid reaction product. Preferred absorbents are the alkali and alkaline earth metal oxides, hydroxides, carbonates and bicarbonates. It is a particular advantage of the present invention, however, that the less reactive absorbents such as the oxides and hydroxides of calcium and magnesium are utilizable while still obtaining all of the aforementioned advantages; namely, high sulfur oxide removal, high absorbent utilization, a water-unsaturated effluent gas and recovery of the spent or reacted absorbent as a dry powder product.

When the magnesium absorbents are utilized it is advantageous to remove any ash constituents from the gas stream prior to treatment in accordance with the present invention. Thus, when the fully reacted absorbent is recovered it is readily regenerable for return to the process.

Further advantages and aspects of the present invention will become more apparent from the drawings and the following description.

BRIEF DESCRIPTION OF THE DRAWING

The sole FIGURE is a flow diagram of a flue gas desulfurization system for practicing the process of the present invention.

DESCRIPTION OF THE PREFERRED EMBODIMENT

Referring to the drawing, therein is depicted a flue gas desulfurization system for practicing a particularly preferred embodiment of the present invention for the removal of sulfur oxides from two gas streams containing the same. Although the present invention is particularly applicable to the treatment of a flue gas resulting from the combustion of fossil fuels, it will be readily apparent that it also is applicable to effluent gases from other sources, such as chemical or metallurgical processing plants. Thus, the gaseous streams may have various contaminants depending upon the particular industrial operation from which they are obtained. For example, in addition to sulfur oxides, the gases may contain other acid gases such as hydrogen halides or various particulate constituents such as uncombusted carbon, various metallic oxides such as silica, alumina, etc. Generally, the gas stream will be obtained from a single source and then divided into first and second gas streams for treatment in accordance with the present invention. It will be apparent, however, that the first and second gas streams could be obtained from different sources. For example, one gas stream could be from a chemical process such as a refinery and the other could be an effluent gas from a boiler.

Each of the gas streams is treated concurrently with a solution or slurry of a basic material; that is, a compound or substance which has a basic reaction in water. The most common materials of this type are the alkali and alkaline earth metal oxides, hydroxides, carbonates and bicarbonates. However, the invention should not be construed as limited to these. Specifically included within the scope of this invention are sodium hydroxide, sodium carbonate, sodium bicarbonate, potassium hydroxide, potassium carbonate, potassium bicarbonate, calcium oxide, calcium hydroxide and calcium carbonate, and the oxides, carbonates and hydroxides of magnesium. Also utilizable in accordance with the present invention are the various naturally occurring ores which may contain one or more of the aforementioned compounds.

The alkali metal compounds are highly reactive and soluble in water and generally are employed as an aqueous solution; the alkaline earth metal compounds, however, are less reactive and range from sparingly soluble to virtually insoluble. Accordingly, these compounds generally are employed in a finely divided form as an aqueous slurry. Accordingly, the aqueous medium containing absorbent for sulfur oxides may be utilized as a solution or slurry depending upon the particular absorbent selected.

Water and a selected absorbent for sulfur oxides are introduced through lines 12 and 14 respectively into a vessel 16 to form an aqueous medium (either slurry or solution) containing absorbent. Advantageously, vessel 16 is provided with a motor driven agitator 18 to ensure thorough mixing of the absorbent and water. The aqueous medium containing absorbent is withdrawn from vessel 16 via pump 20 and passes through a line 22 to a first spray dryer 24. Advantageously, spray dryer 24 is provided with a motor driven disc 26 upon which the aqueous medium impinges to ensure the formation of a finely dispersed spray. Alternatively, the aqueous medium could be introduced into spray dryer 24 through one or more nozzles. The first gas stream is introduced through an inlet 28 into spray dryer 24 where it contacts the finely dispersed spray of aqueous medium. Upon contact between the hot gas stream and the aqueous medium the water is vaporized, cooling the gas stream and facilitating intimate contact between the sulfur oxide constituents of the gases and the absorbent. The latter leads to an efficient utilization of the absorbent and correspondingly high sulfur oxide removal efficiency.

The concentration of the absorbent in the aqueous medium and the relative proportion of hot gas to aqueous medium are adjusted to ensure that there is a stoichiometric excess of absorbent in the spray dryer based on the amount of $SO_2$ to be absorbed and that all of the water is vaporized to leave a dry powder product. From a given flow rate of the first gas stream having a given concentration of sulfur oxide and a given required percent removal, one can readily calculate the necessary rate of addition of absorbent to provide a stoichiometric excess. Generally, from about 125% to 300% of the stoichiometric amount of absorbent required to remove the desired amount of sulfur oxides will be provided.

Based on the flow rate and temperature of the first gas stream, one can also readily compute the quantity of water in the aqueous medium which can be heated and vaporized by the gas stream. Generally, it is preferred to provide a certain margin for error to account for any inefficient thermal contact or subsequent cooling, such that the effluent gas stream from the spray dryer is always water unsaturated. Thus, the effluent gas stream will have a temperature at least 7° O. and preferably at least 12° C. above its adiabatic saturation temperature. To accomplish the foregoing it generally will be necessary that the first gas stream have a temperature of at least 100° C. and also that its adiabatic saturation temperature be at least about 40° C. lower than its actual temperature.

The dry gas, containing particulate powder reaction product, is transferred from spray dryer 24 via a conduit 30 to a filter assembly 32. Filter assembly 32 may comprise a cyclone or electrostatic precipitator, though preferably a bag filter is utilized as the filter. Additional $SO_2$ removal from the gas may occur as it passes through the filter. From filter assembly 32 there is withdrawn a particulate free gas via a conduit 34. The particulate powder reaction products containing unreacted absorbent are collected from filter assembly 32 and transferred via a conduit 36 to a vessel 38 and utilized as a source of $SO_2$ absorbent for forming a second aqueous scrubbing medium. In addition, water (from a source not shown) will be added to vessel 38.

The second aqueous scrubbing medium is used to contact the second gas stream in a conventional wet scrubber 60 which may be a spray tower, packed tower, or other gas/liquid contacting device. The overall system generally will be designed so that the quantity of unreacted absorbent in the material transferred via conduit 36 to the aqueous scrubbing medium in vessel 38 is at least enough to react with the quantity of $SO_2$ to be absorbed in the wet scrubber. Water is also added to the second aqueous scrubbing medium in an amount sufficient to maintain the concentration of absorbent in said medium at a suitable concentration for efficient operation of the scrubber without plugging or crystallization. This concentration is typically in the range of about 5 to 20 wt. % absorbent (based on the total weight of the aqueous medium), including both reacted and unreacted absorbent, for either solutions or slurries.

The wet scrubber 60 is preferably operated with a high rate of recycle of the aqueous medium via drain line 64, vessel 38, pump 40, line 42 and line 62 so that very little composition change occurs in the aqueous medium per pass. The bulk of the absorbent remains in the reacted form; however, sufficient unreacted absorbent is continuously added via line 36 to compensate for the amount reacted with $SO_2$.

A portion of the second aqueous scrubbing medium is withdrawn from the recirculating stream and transferred through lines 44 and 46 to a second spray dryer 48. The second aqueous medium introduced into spray dryer 48 impinges upon a motor driven rotating disc 50 to form a finely dispersed spray. The second gas stream is introduced through an inlet 52 into spray dryer 48. In spray dryer 48 the proportions of the second gas stream and aqueous medium are also controlled to provide a dry powder product and a water-unsaturated gas stream which are withdrawn from spray dryer 48 through a conduit 54 and transferred to a particulate removal system 56, such as a cyclone or the like.

A substantially particle-free gas is withdrawn from particulate removal system 56 via conduit 58 and introduced into wet scrubber 60. In wet scrubber 60 the gas stream is washed with a spray of the second aqueous medium as described above then preferably is passed through a demister 66 which is located within wet scrubber 60 and then out through a conduit 68 where it is combined with the first gas stream from conduit 34.

The combined gas streams from conduits 34 and 68 are introduced into a stack or chimney 70 for discharge into the atmosphere; the gas now being substantially free of particulates and of reduced sulfur oxide content. In addition, the proportions of the two streams are controlled such that the combined stream is water unsaturated and dischargeable into the atmosphere without the formation of an objectionable plume with little or no reheating required. Generally the ratio of the first gas stream to the second gas stream will be within the range of from 0.5:1 to 4.0:1.

Referring back to particulate removal system 56, the particulates removed therein, principally comprising reacted absorbent and any ash constituents contained in the gas streams, are removed via a conduit 72. When the more expensive absorbents are utilized, such as sodium, potassium, and magnesium absorbents, they are preferably introduced into an absorbent regeneration system 74 from which the regenerated absorbent may be returned to the process via a line 76.

It will be appreciated that the present invention is particularly applicable to the magnesium absorbents. It is an advantage of the magnesium absorbents that, although they are the least reactive with $SO_2$, they are readily regenerable. When the magnesium absorbents are utilized the ash constituents of the gas streams are preferably removed prior to introducing the gas streams into the system, thereby the particulates removed via conduit 72 will principally comprise magnesium sulfite, sulfate and minor amounts of unreacted magnesium absorbent. These particulates are readily regenerable by treating them thermally in the presence of a reducing agent, whereby the magnesium sulfite and sulfate are reduced to magnesium oxide and a concentrated $SO_2$ stream is produced which may be introduced directly into a sulfuric acid plant for the production of a salable product. The regenerated absorbent (magnesium oxide) is then returned to the system. If the ash constituents of the fuel or gas streams are not removed prior to treatment in accordance with the present invention, it may then be necessary to solubilize the spent magnesium absorbent to facilitate separating it from the solid ash constituents. Thereafter, the solubilized magnesium must be dried before treatment. Thus, it generally will be preferred to remove such ash constituents prior to treatment. Alternatively, the spent absorbent and any other solid constituents may be removed via line 78 for disposal or transport to another site for regeneration.

Referring back to vessel 38, in some instances it may be desired or advantageous to introduce the aqueous medium withdrawn via pump 40 and lines 42 and 44 into a settling or thickening vessel 80. In such instance, there is withdrawn from an upper portion of vessel 80 a substantially solids-free aqueous medium which is returned to vessel 38 via a line 82. From a lower portion of vessel 80 is withdrawn a solids-rich aqueous medium comprising principally a thick slurry (sludge) of reacted absorbent (including any other solid constituents such as ash) which is introduced into the second spray dryer 48 via a pump 84 and lines 86 and 46. When the spent or fully reacted absorbent is to be transported to another location for regeneration or disposal it may be preferred that it not be a totally dry powder. For example, if it is to be transported in an open vessel it generally is preferred that it be slightly damp. In such instance, a side stream of the medium withdrawn from vessel 80 passes through pump 84 and lines 86 and 88 where it is blended with the dry powder in line 78 to achieve a desired consistency or dampness. In other cases a thick sludge may be most suitable for disposal. In such instances all of the spent absorbent is removed from the system via lines 86 and 88.

Other processing steps may be carried out on the aqueous medium to aid in plant operation or in the disposal of the spent absorbent. For example, the thickened sludge removed from vessel 80 may be further dewatered in a filter. As a second example, an oxygen-containing gas may be sparged through the aqueous medium in vessel 38 or in a separate vessel, not shown, in order to convert sulfites to sulfates. Calcium sulfate, in particular, is considered to be more desirable than calcium sulfite either as a by-product or as a material for disposal. This capability of accepting a wet oxidation step represents one more advantage of the process over simple spray dryer/particulate separator processes.

The following example will further illustrate the present invention. It will be understood that the invention is not to be restricted to this specific illustrative example.

EXAMPLE

In the Table, three exemplary test cases are presented, which are based on the known performance characteristics of the individual components depicted in the drawing. In all three test cases the total amount of gas processed for $SO_2$ removal is 438 standard cubic meters per second (the standard being based on 1 cubic meter at 1 atmosphere and 0° C.). In operations, the solids concentration in the circulating stream from wet scrubber 60 is adjusted by adding or removing water to maintain it at a value suitable for pumping through the scrubber (typically it will comprise from about 5 to 20 wt. % solids). A bleed stream of the wet scrubber slurry is continuously removed and fed to second spray dryer 48. The water concentration of this bleed stream also is adjusted as required so that the amount of water present in the feed stream to spray dryer 48 is that which can be completely evaporated without reaching the adiabatic saturation temperature of the gas stream.

TABLE

| Test case: | 1 | 2 | 3 |
|---|---|---|---|
| Absorbent: | MgO | CaO | CaO |
| Spray Dryer 24 plus Filter Assembly 32 | | | |

TABLE-continued

| Test case: | 1 | 2 | 3 |
|---|---|---|---|
| Absorbent: | MgO | CaO | CaO |
| Feed Gas | | | |
| Volume (std m$^3$/s) | 175 | 307 | 254 |
| SO$_2$ Concentration (ppm) | 1000 | 1000 | 2000 |
| SO$_2$ (g mole/s) | 7.8 | 13.7 | 22.6 |
| Temperature (°C.) | 177 | 177 | 177 |
| Liquid Feed | | | |
| Stoichiometry Ratio | 2.5 | 1.5 | 1.7 |
| Active Absorbent (g mole/s) | 19.5 | 19.7 | 38.3 |
| Water (g mole/s) | 529 | 926 | 767 |
| Product Gas | | | |
| SO$_2$ Concentration (ppm) | 400 | 290 | 440 |
| SO$_2$ (g mole/s) | 3.1 | 3.9 | 5.0 |
| Temperature (°C.) | 77 | 77 | 77 |
| Product Solids | | | |
| Active absorbent (g mole/s) | 14.8 | 9.9 | 20.6 |
| Inactive Absorbent (g mole/s) | 4.7 | 9.8 | 17.7 |
| SO$_2$ Removal (%) | 60 | 71 | 78 |
| Absorbent Utilization (%) | 24 | 50 | 46 |
| Second Spray Dryer 48 plus Particulate Removal System 56 | | | |
| Feed Gas | | | |
| Volume (std m$^3$/s) | 263 | 131 | 184 |
| SO$_2$ Concentration (ppm) | 1000 | 1000 | 2000 |
| SO$_2$ (g mole/s) | 11.7 | 5.8 | 16.4 |
| Temperature (°C.) | 177 | 177 | 177 |
| Liquid Feed | | | |
| Active Absorbent (g mole/s) | 4.8 | 5.5 | 10.1 |
| Inactive Absorbent (g mole/s) | 14.7 | 14.2 | 28.2 |
| Water (g mole/s) | 794 | 397 | 556 |
| Product Gas | | | |
| SO$_2$ Concentration (ppm) | 900 | 800 | 1400 |
| SO$_2$ (g mole/s) | 10.6 | 4.7 | 11.5 |
| Temperature (°C.) | 77 | 77 | 77 |
| Product Solids | | | |
| Active Absorbent (g mole/s) | 3.7 | 4.3 | 5.1 |
| Inactive Absorbent (g mole/s) | 15.8 | 15.4 | 33.1 |
| SO$_2$ Removal (%) | 10 | 20 | 30 |
| Wet Scrubber 60 | | | |
| Feed Gas = Particulate Removal System 56 Product Gas | | | |
| Feed Absorbent = Filter Assembly 32 Product Solids | | | |
| Circulating Absorbent = Feed absorbent plus water <20% solids | | | |
| Product Gas | | | |
| SO$_2$ Concentration (ppm) | 54 | 40 | 112 |
| SO$_2$ (g mole/s) | 0.62 | 0.23 | 0.92 |
| Temperature (°C.) | 49 | 49 | 49 |
| Product Slurry | | | |
| Active Absorbent (g mole /s) | 4.8 | 5.5 | 10.1 |
| Inactive absorbent (g mole/s) | 14.7 | 14.2 | 28.2 |
| SO$_2$ Removal (%) | 94 | 95 | 92 |
| Overall Results | | | |
| SO$_2$ Removal (%) | 81 | 79 | 85 |
| Absorbent Utilization (%) | 81 | 78 | 87 |
| Overall Stoichiometry* | 1.0 | 1.0 | 0.98 |
| Mixed Product Gas (Stack 70) | | | |
| Volume (std m$^3$/s) | 438 | 438 | 438 |
| SO$_2$ Concentration (ppm) | 192 | 215 | 302 |
| SO$_2$ (g mole/s) | 3.7 | 4.1 | 5.9 |
| Temperature (°C.) | 60 | 68 | 65 |
| Saturation Temperature (°C.) | 51 | 52 | 51 |

*Ratio of total moles of active absorbent fed to system to total moles of SO$_2$ contained in the two feed gas streams.

From the foregoing Table, it is believed that the efficacy of the present invention is clearly shown. Specifically referring to the overall results, it is seen that about 80% or higher SO$_2$ removal is obtained in each test case even when using the less reactive alkaline earth metal absorbents. Further, the absorbent utilization is about 80% or higher even though the overall stoichiometry (ratio of absorbent to sulfur oxide) is only about 1. Still further, it is seen that in each instance the gas discharged through stack 70 (combined gas streams) has a temperature at least 9° C. above its adiabatic saturation temperature such that it is dischargeable into the atmosphere without the formation of an objectionable plume with little or no reheat requirement. By comparison, simple dry scrubber/particulate removal systems alone give SO$_2$ removals of only 60% to 78%, even with stoichiometry ratios of 1.5 to 2.5, based on the performance data given in the Table for that portion of the process.

In some instances, it may be advantageous to use more than on absorbent in the overall system. For example, it may be preferred to dispose of the absorbed sulfur oxide as a compound of calcium, yet operate the wet scrubber with a clear solution rather than a slurry. In such instance, a slurry of slaked lime (calcium hydroxide) is used, as described above, to remove SO$_2$ from the first gas stream in a spray dryer-particulate separator system under conditions to produce a purified gas product and solid particles comprising both reacted and reactive calcium compounds. The solid particles are added to an aqueous scrubbing medium containing reacted alkali metal compounds, such as sodium bisulfite and sodium sulfate in solution, to cause a reaction between the reactive calcium compounds and the reacted sodium compounds. This reaction will produce reacted calcium compounds, such as calcium sulfite and calcium sulfate in the form of undissolved solids, and reactive sodium compounds, such as sodium sulfite and sodium hydroxide, in the form of a solution. The undissolved solids are separated from the solution and the solution containing reactive sodium compounds is then used in the wet scrubber to remove sulfur oxides from the second gas stream.

It will, of course, be realized that many variations of the operating conditions and selection of absorbents may be used in the practice of this invention within the limits of the critical parameters set forth, depending upon the particular sulfur oxide content and temperature of the flue gas to be desulfurized as well as the specific requirements of the system with regard to product gas purity and spent absorbent disposal or regeneration. Thus, while the examples illustrating this invention have been described with respect to specific concentrations, times, temperatures and other reaction conditions, and what is now considered to represent its best embodiment has been illustrated and described, the invention may be otherwise practiced within the scope of the teaching set forth as will be readily apparent to those skilled in this art. Accordingly, this invention is not to be limited by the illustrative and specific embodiments thereof, but its scope should be determined in accordance with the following claims.

What is claimed is:

1. A process for the removal of sulfur dioxide from first and second gas streams containing the same, the first gas stream being at a temperature of at least 100° C. with an adiabatic saturation temperature at least 40° C. lower than its actual temperature, wherein each of the gas streams is contacted with an aqueous medium containing an absorbent for sulfur dioxide comprising the steps of:

(a) forming an aqueous slurry of a calcium absorbent for the sulfur dioxide;

(b) introducing the first gas stream into a spray dryer zone and contacting it with a finely dispersed spray of the aqueous slurry, the slurry introduced being controlled as to quantity and absorbent concentration so as to provide water to the gas in an amount that produces a cooled product gas having a temperature at least 70° C. above its adiabatic saturation temperature, and to provide the calcium absorbent in an amount equivalent to 125–300% of the stoichiometric amount required to react with the sulfur oxides to be removed from the first gas stream to produce a gas stream of reduced sulfur oxide content and dry particulate reaction products including both reacted and reactive calcium compounds;

(c) separating the two spray dryer products in a gas/solids separator to provide a gas stream substantially free of particulates and having a substantially reduced sulfur oxide content, and separately recovering the dry particulates containing reactive calcium compounds;

(d) forming an aqueous solution of a sodium absorbent for the sulfur dioxide;

(e) introducing the second gas stream into an aqueous scrubbing zone and contacting it with the aqueous solution of the sodium absorbent in an amount equivalent to 100–200% of the stoichiometric amount of absorbent required to react with the sulfur oxides to be removed from the second gas stream to produce (1) a gas stream of substantially reduced sulfur oxide and particulate content and (2) a solution of reactive sodium absorbent and reacted sodium absorbent;

(f) withdrawing a stream of the solution from said aqueous scrubbing zone of step (e) and contacting it with the dry particles containing reactive calcium compounds from step (c) whereby the reacted sodium absorbent and the reactive calcium compounds react to form calcium sulfite and calcium sulfate particulates, and sodium sulfite and sodium hydroxide in the form of a solution;

(g) returning the formed solution from step (f) to step (e) and recovering the calcium sulfite and sulfate particulates for disposal;

(h) combining the gas stream from steps (c) and (e) (1) to provide an effluent gas stream substantially free of particulates, having a substantially reduced sulfur oxide content, and controlling the proportions of the two streams such that the effluent gas stream has a temperature at least 50° C. above its adiabatic saturation temperature whereby it may be discharged to the atmosphere without the necessity of reheating to prevent the formation of an objectionable plume.

2. The process of claim 1 wherein the proportions of the two streams are controlled such that the effluent gas stream has a temperature at least 10° C. above its adiabatic saturation temperature.

3. The process of claim 1 wherein the calcium sulfite formed in step (f) is oxidized to calcium sulfate.

4. The process of claim 1 wherein in step (c) said gas/solids separator is a fabric filter.

* * * * *